United States Patent [19]

Angerer

[11] Patent Number: 4,902,733
[45] Date of Patent: Feb. 20, 1990

[54] AQUEOUS PROTECTIVE COATING COMPOSITION COMPRISING 3-ALKOXY-2-HYDROXYPROPYLHYDROX- YETHYLCELLULOSE AND FILM FORMING LATEX

[75] Inventor: John D. Angerer, Chester, Va.
[73] Assignee: Aqualon Company, Wilmington, Del.
[21] Appl. No.: 223,577
[22] Filed: Jul. 25, 1988
[51] Int. Cl.$^4$ .......................... C08J 1/26; C08B 11/08; C08B 11/20
[52] U.S. Cl. ........................................ 524/44; 524/42; 524/43; 536/88; 536/96
[58] Field of Search .................... 536/84–90, 536/96; 524/42, 43, 44

[56] References Cited

U.S. PATENT DOCUMENTS

| | | | |
|---|---|---|---|
| 3,091,542 | 5/1963 | Anderson | 106/188 |
| 4,009,329 | 2/1977 | Arney et al. | 536/84 |
| 4,228,277 | 10/1980 | Landoll | 536/277 |
| 4,352,916 | 10/1982 | Landoll | 526/200 |
| 4,663,159 | 5/1987 | Brode et al. | 424/70 |

FOREIGN PATENT DOCUMENTS 0281360 7/1988 European Pat. Off. .

OTHER PUBLICATIONS

E. D. Klug, "Some Properties of Water–Soluble Hydroxyalkyl Celluloses and Their Derivatives", Journal of Polymer Sciences, vol. 36, Part C, 491–508, at 497–498 (John Wiley & Sons, Inc. 1971).

Primary Examiner—John Kight
Assistant Examiner—Carlos Azpuru
Attorney, Agent, or Firm—Mark D. Kuller

[57] ABSTRACT

An aqueous protective coating composition comprising (a) a nonionic, water-soluble 3-alkoxy-2-hydroxypropylhydroxyethylcellulose wherein the alkyl moiety is a straight or branched chain alkyl group having 6 to 24 carbon atoms and (b) a film forming latex, is disclosed.

14 Claims, No Drawings

AQUEOUS PROTECTIVE COATING COMPOSITION COMPRISING 3-ALKOXY-2-HYDROXYPROPYLHYDROXYETHYLCELLULOSE AND FILM FORMING LATEX

This invention relates to an aqueous protective coating composition comprising (a) a nonionic, water-soluble 3-alkoxy-2-hydroxypropylhydroxyethylcellulose wherein the alkyl moiety is a straight or branched chain alkyl group having 6 to 24 carbon atoms and (b) a film forming latex.

BACKGROUND OF THE INVENTION

Use of water-soluble polymers, such as hydroxyethyl-cellulose (HEC) and polyvinyl alcohol, as rheological modifiers of aqueous dispersions, such as protective coating compositions or latex paints, has found wide acceptance. The hydrophobically-modified cellulose ether derivatives modified with the long chain alkyl groups described by Landoll, in U.S. Pat. Nos. 4,228,277 and 4,352,916, have shown promise in many applications and one such polymer, a modified HEC, is presently sold under the Trademark Natrosol Plus by the Aqualon Company, Wilmington, DE. Latex paints prepared with this modified HEC perform extremely well compared to those prepared with other well known cellulosic polymers. There are many difficulties in producing such polymers. Use of long chain alkyl bromides to produce such polymers shows much promise but has a number of disadvantages, e.g., long chain alkyl bromides are not reactive enough and require long reaction times at high temperatures. In addition, high caustic levels must be used in production. Further, these polymers have high levels of hydroxyethyl groups, which cause the polymers to be hygroscopic in nature and have caking problems.

E. D. Klug, in "Some Properties of Water-Soluble Hydroxyalkyl Celluloses and Their Derivatives", Journal of Polymer Science, Volume 36, Part C, 491–508, at 497–98 (John Wiley & Sons, Inc. 1971), mentions lowering the cloud point of hydroxypropylcellulose and hydroxyethylcellulose by use of a long chain alkyl glycidyl ether such as decyl glycidyl ether.

It has been discovered that latex paints prepared with the modified hydroxyethylcellulose, i.e., 3-alkoxy-2-hydroxypropylhydroxyethylcellulose provide properties similar to unmodified cellulosic thickened latex paints with respect to thickening efficiency, leveling, 60° gloss and color development. Property enhancements are obtained with respect to spatter resistance, sag resistance and high shear viscosity (ICI).

The polymers of this invention can be prepared using simpler processing techniques than those used to prepare the hydrophobically modified polymers described by Landoll. In addition, these polymers do not have the disadvantages of the Landoll polymers. That is, such polymers can tolerate lower levels of hydroxyethyl groups and, as a result, are less hygroscopic and do not have as severe a caking problem as the polymers of Landoll, and are easier to process and use.

SUMMARY OF THE INVENTION

Accordingly, this invention is directed to an aqueous protective coating composition comprising (a) a nonionic, water-soluble 3-alkoxy-2-hydroxypropylhydroxyethylcellulose, wherein the alkyl moiety is a straight or branched chain alkyl group having 6 to 24 carbon atoms and (b) a film forming latex.

DETAILED DESCRIPTION OF THE INVENTION

The 3-alkoxy-2-hydroxypropylhydroxyethylcellulose of this invention is substantially completely soluble in water at room temperature. It can be prepared from hydroxyethylcellulose (HEC), or can be prepared directly from cellulose. HEC, chemical cotton and other sources of cellulose that are useful in manufacturing the polymers of this invention are readily available.

The preferred polymer per this invention has a hydroxyethyl molar substitution (M.S.) (number of moles of substituent per anhydroglucose unit in the cellulose molecule) of about 1.5 to 4.5. It has a viscosity in the range of about 5 to about 60,000 centipoise in a 1 weight % solution, using a Brookfield Synchro-Lectric Model LVF Viscometer at 6 rpm (Brookfield LVF Viscosity).

The 3-alkoxy-2-hydroxypropyl group is generally contained in an amount of about 0.05 to about 2.0 wt. %, preferably about 0.1 to about 1.0 wt. %, based on the dry weight of the substituted polymer. The alkyl group is a straight or branched chain alkyl group having 6 to 24, more Preferably a straight chain alkyl group 10 to 18 carbon atoms.

The polymers of this invention can be prepared in essentially the same manner as described by Landoll in U.S. Pat. Nos. 4,228,277 and 4,352,916. Briefly, modification can be effected by slurrying a polymer, such as HEC, HPC, HPMC, etc., in an inert organic diluent such as a lower aliphatic alcohol, ketone, or hydrocarbon and adding a solution of alkali metal hydroxide to the resultant slurry at low temperature. When the cellulose ether is thoroughly wetted and swollen by the alkali, the alkyl glycidyl ether is added and the reaction mixture is heated with continued agitation until complete. Residual alkali is then neutralized and the product is recovered, washed with inert diluents, and dried.

When prepared directly from cellulose, the polymers can be prepared by first adding chemical cotton to a mixture of an inert organic diluent and aqueous alkali metal hydroxide. Then, ethylene oxide is added to the resultant alkalized cellulose and once the reaction is completed the product is treated with acid. To this reaction mixture is added the alkyl glycidyl ether and, optionally, a second increment of ethylene oxide. The reaction mass is once again heated to effect reaction. After the reaction is complete, the product is neutralized, filtered, washed with inert diluents and dried.

The following examples illustrate the preparation of polymers of this invention. Therein, all parts, percentages, etc., are by weight, unless otherwise noted.

PREPARATION EXAMPLE 1

To a mixture of 689 parts t-butyl alcohol, 24 parts acetone and a solution of 27.4 parts sodium hydroxide in 100 parts water was added low molecular weight chemical cotton (84 parts "as is"). The resulting mixture was vigorously stirred at 24° C. for 45 minutes. Then, 27.3 parts ethylene oxide was added to the alkali cellulose. After heating at 70° C for 1 hour, the reaction mixture was cooled to 55° C. and treated with 48 parts 70% nitric acid. To this reaction mixture was added a second increment of 70.3 parts ethylene oxide and 24 parts of a $C_{12}/C_{13}$ alkyl glycidyl ether (Heloxy WC-9, Wilmington Chemical Corporation, Wilmington, DE). The resulting reaction mixture was heated at 95° C. for 90 minutes and then 115° C. for 2 hours. After cooling the reaction mixture to room temperature, it was neutralized with 10 parts 70% nitric acid. Next, the reaction mixture was filtered and the filtered cake was washed several times with 80:20 acetone/water mixture to remove salts and other by-products. The resultant polymer was characterized as $C_{12}/C_{13}$ 3-alkoxy-2-hydroxypropylhydroxyethylcellulose having a 1% Brookfield viscosity at 30 rpm of 500 cps and cloud point (15% NaCl solution) of 43°–53° C.

PREPARATION EXAMPLE 2

The procedures of Preparation Example 1 were repeated using 12 parts n-butyl glycidyl ether and 12 parts of the $C_{12}/C_{13}$ alkyl glycidyl ether in place of 24 parts of the a $C_{12}/C_{13}$ alkyl glycidyl ether. The resultant product was $C_4/C_{12}/C_{11}$ 3-alkoxy-2-hydroxypropylhydroxyethyl-cellulose having 1% Brookfield viscosity at 30 rpm of 520 cps and a cloud point (15% NaCl solution) of 25° C.

PREPARATION EXAMPLE 3

A slurry of 80 parts by weight of high viscosity hydroxyethylcellulose (M.S. 2.5; 1% solution viscosity measured in a Brookfield LVF viscometer of 3400 mPas) in a mixture of 859 parts t-butanol and 113.4 parts water was prepared. The slurry was degassed by sparging with $N_2$. To this was added 2.6 parts of aqueous 50% NaOH. The temperature of the slurry was maintained at ambient temperature by removing the heat generated due to addition of NaOH. This slurry was agitated under a nitrogen atmosphere for 45 minutes. Then, 24 parts of 2-ethylhexylglycidyl ether was added. The temperature was raised to 75° C. over one hour and maintained for four hours. The mixture was cooled to 25° C. and neutralized with aqueous 65% nitric acid. The reaction liquid was removed and the product was washed and hardened with 80/20 (twice), 84/10, 88/12, 92/8, 96/4 and 98/2 acetone/water mixtures. The product was filtered and dried in a ventilated oven for 60 minutes. The resulting product had a 3-(2-ethylhexyloxy)-2-hydroxypropyl M.S. of 0.29.

The principal ingredients of water-soluble protective coating compositions per this invention are film-forming latices selected from the group consisting of styrene-butadiene copolymers, vinyl acetate polymers and copolymers, and acrylic polymers and copolymers (the most preferred of which are acrylic and vinyl acetate - acrylic in the United States, and styrene acrylics and VeoVa acetate (also known as vinyl acetate - vinyl versatate) in Europe) and the polymers of this invention, which serve as rheology modifiers.

Typically, aqueous protective coating compositions contain, by weight of the total composition, from about 10 parts to about 50 parts of a latex, from about 10 parts to about 50 parts of an opacifying pigment (e.g., $TiO_2$, clay, calcium carbonate, silica, talc, etc.) and from about 0.1 part to about 2 parts of dispersants/surfactants (e.g., polyacrylates, potassium tripolyphosphate, 2-amino-2-methyl-1-propanol, etc.).

The viscosifying effect of the polymers of this invention depends on molecular weight, hydroxyethyl M.S., 3-alkoxy-2-hydroxypropyl group length, and amount of 3-alkoxy-2-hydroxypropyl group, etc. Further, the amount of the polymer used determines viscosity. The polymer may be added in any amount sufficient to modify viscosity to the desired degree. Generally, the total amount of polymer will be in the range of about 0.1 to about 1.0%, preferably 0.3% to 1.0%, based on the weight of the total protective coating composition.

The solution viscosity may be further controlled through use of surfactants. Neutral or nonionic surfactants may interact with the 3-alkoxy-2-hydroxypropyl group to increase solution viscosity.

Other common ingredients include defoamers, preservatives, coalescing agents (e.g., glycols and glycol ethers, etc.), etc.

This invention is demonstrated in the following examples, which are illustrative and not intended to be limiting, wherein all parts, percentages, etc., are by weight and all weight percentages are based on the total weight of the aqueous solution (e.g., latex paint), unless otherwise indicated.

EXAMPLES 1–2

Latex paints were prepared using two commercially available latices.

An interior semi-gloss paint was prepared using Rhoplex AC-417 latex (Rohm and Haas Company, Philadelphia, PA). First, the following were mixed for 30 minutes at high speed with a Cowles blade:

TABLE 1

| Component | Parts (by weight) |
|---|---|
| Propylene Glycol | 140.00 |
| Tamol SG-1[1] | 14.90 |
| Hercules SGL Defoamer[2] | 3.50 |
| Water | 43.75 |
| Ti-Pure R-900[3] | 420.00 |
| Silica 1160[4] | 43.75 |

[1]Available from Rohm & Haas Company, Philadelphia, PA.
[2]Available from Hercules Incorporated, Wilmington, DE.
[3]Available from E. I. du Pont de Nemours & Company, Inc., Wilmington, DE.
[4]Available from Illinois Minerals Company, Cairo, IL.

Then, the following were added and the batch was mixed for 30 minutes at reduced speed with a propeller blade:

TABLE 2

| Component | Parts (by weight) |
|---|---|
| Hercules SGL Defoamer[1] | 4.75 |
| Propylene Glycol | 17.50 |
| Texanol[2] | 37.80 |
| Super-Ad-It[2] | 1.75 |
| Triton GR 7M[3] | 0.90 |
| Rhoplex AC-417 | 875.00 |

[1]Available from Hercules Incorporated, Wilmington, DE.
[2]Available from Eastman Chemical Products, Kingsport, IN.
[3]Available from Rohm & Haas Company, Philadelphia, PA.

The above base paint was then thickened to an initial viscosity of 90 Krebs Units ("KU", measured on a Stormer viscometer) with 297 parts of an aqueous thickener solution containing the polymer of this invention. The polymer of Preparation Example 1 was used in Example 1 and of Preparation Example 2 in Example 2.

EXAMPLES 3–4

An interior flat paint was prepared using Polyco 2161 latex (a vinyl acetate/acrylic copolymer emulsion available from Rohm & Haas Company, Philadelphia, PA.). First, the following were mixed for 30 minutes at high speed with a Cowles blade:

TABLE 3

| Component | Parts (by weight) |
|---|---|
| Water | 270.00 |
| KTPP[1] | 2.70 |
| Ross & Rowe 551[2] | 2.70 |

TABLE 3-continued

| Component | Parts (by weight) |
|---|---|
| Tamol 731 (25 wt. %)[3] | 6.75 |
| Hercules SGL Defoamer[4] | 2.70 |
| Ethylene Glycol | 27.00 |
| Carbitol Acetate | 13.50 |
| Ti-Pure R-901[5] | 236.25 |
| Camel Carb[6] | 202.50 |
| Iceberg Clay[7] | 168.75 |
| Silica 1160[8] | 43.75 |

[1] Available from FMC Corporation, Philadelphia, PA.
[2] Available from Archer Daniels Midland Company, Decatur, IL.
[3] An aqueous solution containing 25 weight % Tamol 731(sodium salt of a carboxylated polyelectrolyte), available from Rohm & Haas Company, Philadelphia, PA.
[4] Available from Hercules Incorporated, Wilmington, DE.
[5] Available from E. I. du Pont de Nemours & Company, Inc.
[6] Available from Genstar Stone Products Company, Hunt Valley, MD.
[7] Available from Burgess Pigment Company, Sandersville, GA.
[8] Available from Illinois Mineral COmpany, Cairo, IL.

Then, the following were added and the batch was mixed for 30 minutes at reduced speed with a propeller blade.

TABLE 4

| Component | Parts (by weight) |
|---|---|
| Makon 10[1] | 4.05 |
| Polyco 2161 | 270.00 |
| Merbac 35[2] | 0.68 |

[1] Available from Stepan Company, Northfield, IL.
[2] Available from Calgon Corporation, Pittsburgh, PA.

The above base paint was then thickened to an initial viscosity of 90 KU with 297 parts of an aqueous thickener solution containing the polymer of this invention. The polymer of Preparation Example 1 was used in Example 3 and of Preparation Example 4 in Example 4.

All of the example paints were evaluated as follows.

Gloss

Gloss was evaluated using a Gardner Model GG-7526 glossmeter (available from Gardner/Neotec, Silver Spring, MD). A 7 mil (wet) drawdown of the paint, made with a film applicator, was cast on a glass surface and allowed to dry overnight. The dried product was then evaluated using a glossmeter.

Color Development

A subjective test using a semi-gloss paint tinted with a thalo blue colorant was used. The color between a rubbed and unrubbed area of a test card was rated on a scale of 0 (no difference) to 4 (rubbed area very much darker).

To a ½ pint lined paint can, was added 98 grams of thickened paint and 2.0 grams of Colortrend ® Thalo Blue colorant (Nuodex, Inc., Piscataway, NJ). Then, the paint was shaken for 5 minutes using a Red Devil Shaker. Afterwards, using a 5 mil drawdown blade, a portion of the paint was drawn over a plain white chart, Form WB (available from the Leneta Company, Ho-Ho-Kus, NJ). The bottom (unsealed) portion of the paint film was rubbed using a circular motion, until the film was tacky. Three minutes later, the top (sealed-portion) was rubbed in the same manner. The cards were hung to dry and, then, were evaluated for color difference, with the specification being based on the rating of the unsealed portion of the card.

Leveling

Leveling was measured using the procedures of ASTM 4062-81.

Sag

Sag was measured using:
1. Leneta Anti-sag Meter (a leveling test blade with a series of ¼ inch notches of varying clearance (4 to 24 mils., with a 2 mil difference between notches), available from the Leneta Company, Ho-Ho-Kus, NJ).
2. Leneta Form 7B test chart (a lacquer coated paper with a test area colored black, available from Leneta Company, Ho-Ho-Kus, NJ).
3. Leneta Drawdown Plate with straight edge (Leneta Company, Ho-Ho-Kus, NJ).
4. Syringe (10cc) with 16-20 gauge needle.

The drawdown blade was placed at the edge of the black potion of the 7B test chart. Then, 5 cc of paint was applied with the syringe along the based of the blade. Then, the paint was drawn down along the straight edge at slow speed. Afterwards, the test sample was hung with the bars positioned horizontally and the thicker bars at the bottom of the chart.

The samples were evaluated for sag value when they dried by assigning values according to the thickness of the last bar from the top that does not run down and touch the next and adding the potion of the next bar that does not make contact with the lower bar (e.g., half a clear bar would be 1).

Spatter

Roller spatter was evaluated by catching spatter from a horizontally moving 3 inch roller (¼ inch nap) on a black plastic panel placed just below the substrate (1 square foot of Kem Glo Coated Paper from Sherwin-Williams, Cleveland, OH). In this test, 15 strokes are made in 15 seconds, the roller is inverted and 15 strokes are repeated. Spatter ratings are assigned according to photographic standards found in the ASTM Paint Testing Manual, Section 8.2.8.4.1 (Gardner/Sward, 13th Ed. 1972).

ICI Bushing Viscosity

Brushing viscosity was determined on an ICI cone and plate high shear (10,000 sec$^{-1}$) viscometer (Pacific Scientific, Silver Spring, MD) approximately 16-24 hours after the paint was prepared. After the sample stage was allowed to reach 25° C., 3 ml of sample were placed on the stage, the spindle was lowered and turned on, and a reading was taken after 15 seconds.

TABLE 5

| Sample | 1% BV (cps)[1] | Paint Viscosity (KU) (Initial/Overnight) | % Thickener[2] | Spatter | Leveling | Sag | ICI (Poise) | 60° Gloss | Color Development (Low Shear/High Shear) (0 4, where 0 = best) |
|---|---|---|---|---|---|---|---|---|---|
|  | 300 | 91/101 | 0.26 | 8 |  | 18.5 | 1.1 | 40.3 | ½ |
| 2 | 520 | 88/93 | 0.34 | 7 |  | 18.5 | 1.1 | 26.3 | 4/4 |
| 3 | 300 | 95/102 | 0.65 | — | 3 | 20.0 | 1.5 | — | — |

TABLE 5-continued

| Sample | 1% BV (cps)[1] | Paint Viscosity (KU) (Initial/Overnight) | % Thickener[2] | Spatter | Leveling | Sag | ICI (Poise) | 60° Gloss | Color Development (Low Shear/High Shear) (0 4, where 0 = best) |
|---|---|---|---|---|---|---|---|---|---|
| 4 | 520 | 92/94 | 0.52 | — | 3 | 19.0 | 1.2 | — | — |

[1] Brookfield viscosity in an aqueous 1 weight percent solution at 25° C.
[2] Weight %, based on the total weight of the paint.

The above examples demonstrate that a latex paint thickened with the polymers of this invention exhibits desirable paint rheology, can stability and freeze-thaw stability.

While the invention has been described with respect to specific embodiments, it should be understood that they are not intended to be limiting and that many variations and modifications are possible without departing from the scope of this invention.

I claim:

1. An aqueous protective coating composition comprising (a) a nonionic, water-soluble 3-alkoxy-2-hydroxypropylhydroxyethylcellulose wherein the alkyl moiety is a straight or branched chain alkyl group having 6 to 24 carbon atoms and (b) a film forming latex.

2. The aqueous protective coating composition of claim 1, wherein the nonionic, water-soluble 3-alkoxy-2-hydroxypropylhydroxyethylcellulose has a hydroxyethyl M.S. of from about 1.5 to about 4.5.

3. The aqueous protective coating composition of claim 2, wherein the nonionic, water-soluble 3-alkoxy-2-hydroxypropylhydroxyethylcellulose has a Brookfield LVF Viscosity of from 5 to 60,000 centipoise.

4. The aqueous protective coating composition of claim 3, wherein the 3-alkoxy-2-hydroxypropylhydroxyethylcellulose comprises 0.05 to 2.0%, by total dry weight, 3-alkoxy-2-hydroxypropyl group.

5. The aqueous protective coating composition of claim 4, containing from 0.1 to 1.0%, by total weight, of the nonionic, water-soluble 3-alkoxy-2-hydroxypropylhydroxyethylcellulose.

6. An aqueous protective coating composition of claim 4, wherein the film-forming latex is selected from the group consisting of styrene-butadiene copolymers, vinyl acetate polymers and copolymers, and acrylic polymers and copolymers.

7. An aqueous protective coating composition of claim 5, wherein the film-forming latex is selected from the group consisting of styrene-butadiene copolymers, vinyl acetate polymers and copolymers, and acrylic polymers and copolymers.

8. The aqueous protective coating composition of claim 7, wherein the alkyl moiety is a straight chain alkyl group having 8 to 18 carbon atoms.

9. The aqueous protective coating composition of claim 8, wherein the 3-alkoxy-2-hydroxypropylhydroxyethylcellulose comprises 0.1 to about 1.0, by total dry weight, 3-alkoxy-2-hydroxypropyl group.

10. The aqueous protective coating composition of claim 7, comprising, by weight of the total composition, from about 10 parts to about 50 parts of a film-forming latex, from about 10 parts to about 50 parts of an opacifying pigment and from about 0.1 part to about 2 parts of a dispersing agent.

11. The aqueous protective coating composition of claim 9, comprising, by weight of the total composition, from about 10 parts to about 50 parts of a film-forming latex, from about 10 parts to about 50 parts of an opacifying pigment and from about 0.1 part to about 2 parts of a dispersing agent.

12. The aqueous protective coating composition of claim 7, containing from 0.3% to 1.0$, by total weight, of the nonionic, water-soluble 3-alkoxy-2-hydroxypropylhydroxyethylcellulose.

13. The aqueous protective coating composition of claim 11, containing from 0.3% to 1.0%, by total weight, of nonionic, water-soluble 3-alkoxy-2-hydroxypropylhydroxyethyloellulose.

14. An aqueous protective coating composition of claim 11, wherein the opacifying pigment is selected from the group consisting of $TiO_2$, clay, calcium carbonate, silica and talc.

* * * * *

UNITED STATES PATENT AND TRADEMARK OFFICE
CERTIFICATE OF CORRECTION

PATENT NO. : 4,902,733
DATED : February 20, 1990
INVENTOR(S) : John D. Angerer

It is certified that error appears in the above-identified patent and that said Letters Patent is hereby corrected as shown below:

Column 3, line 17 " $C_4/C_{12}/C_{11}$ "

should read -- $C_4/C_{12}/C_{13}$ --

Column 8, line 34 " 0.3% to 1.0$ "

should read -- 0.3% to 1.0% --

Signed and Sealed this

Seventh Day of May, 1991

*Attest:*

HARRY F. MANBECK, JR.

*Attesting Officer*    *Commissioner of Patents and Trademarks*